United States Patent [19]

Maejima

[11] Patent Number: 4,659,302
[45] Date of Patent: Apr. 21, 1987

[54] DECKLE STRUCTURE FOR A FILM EXTRUSION DIE

[75] Inventor: Mokichi Maejima, Tokyo, Japan

[73] Assignee: Jyohoku Seiko Co., Ltd., Tokyo, Japan

[21] Appl. No.: 806,703

[22] Filed: Dec. 9, 1985

[30] Foreign Application Priority Data

Jan. 22, 1985 [JP] Japan ............................... 60-8434
Sep. 2, 1985 [JP] Japan ............................. 60-192092

[51] Int. Cl.⁴ ................................................ B29C 47/16
[52] U.S. Cl. ................................. 425/190; 264/177 R; 264/177.1; 425/466
[58] Field of Search ............... 425/131.1, 133.5, 190, 425/376 R, 381, 461, 465, 466, 467, 186, 191; 264/177 R

[56] References Cited

U.S. PATENT DOCUMENTS

| | | | |
|---|---|---|---|
| 3,018,515 | 1/1962 | Sneddon | 425/466 |
| 3,706,518 | 12/1972 | Bunte et al. | 425/466 |
| 3,829,274 | 8/1974 | Melead | 425/466 |
| 3,832,120 | 8/1974 | Shaffer | 425/466 |
| 4,248,579 | 2/1981 | Maejima | 425/466 |
| 4,533,510 | 8/1985 | Nissel | 425/462 |

*Primary Examiner*—Jay H. Woo
*Assistant Examiner*—J. Fortenberry
*Attorney, Agent, or Firm*—Bucknam and Archer

[57] ABSTRACT

A T-shaped extrusion die for extruding films ofthermally flowable synthetic resin, comprising a manifold, a slot-like passage, lips, inner deckles for varying the edge thickness and width of the resulting extruded film and inner deckle rods for regulating the width thereof, the extrusion die characterized in that the inner deckles are each divided into upper and lower inner deckle portions for conveniently varying the width of the resulting extruded film and the inner rods are each provided at its tip with a tongue shaped protrusion for regulating the width of the resulting extruded film without forming edge beads at both edges thereof.

2 Claims, 3 Drawing Figures

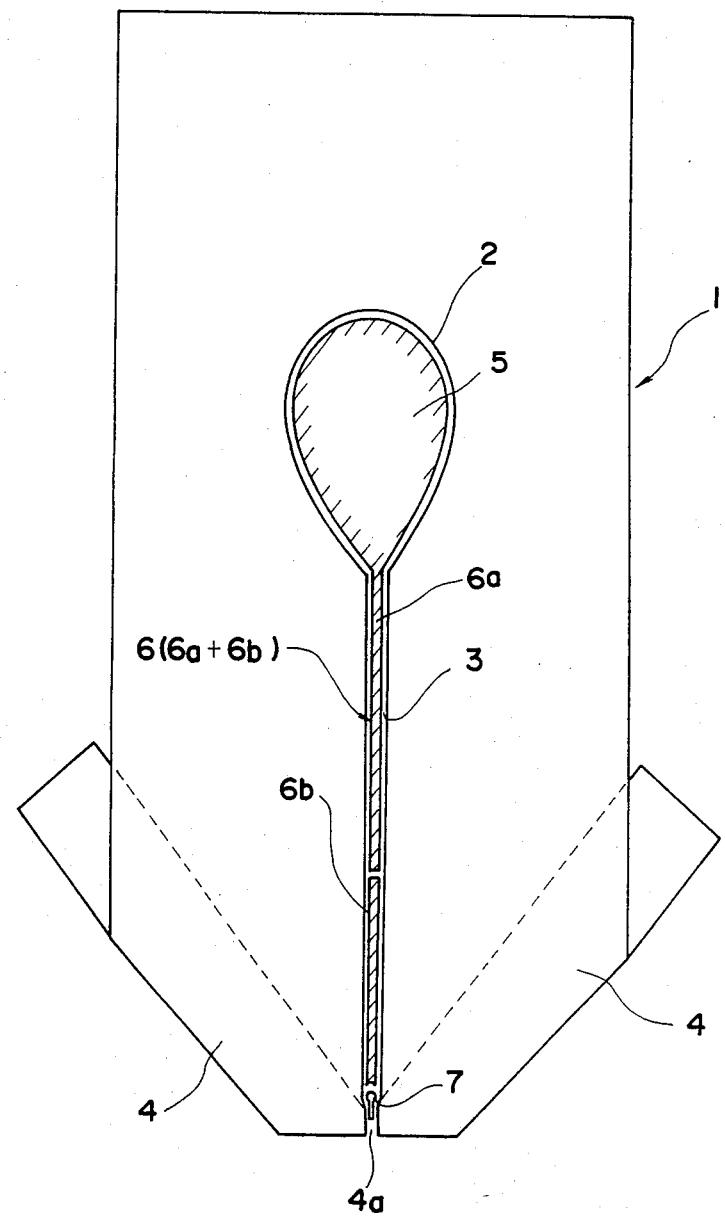

DECKLE STRUCTURE FOR A FILM EXTRUSION DIE

BACKGROUND OF THE INVENTION

This invention relates to an improved T-shaped extrusion die for use in forming a film of a synthetic resin such as a polyethylene resin or the like, and more particularly to such a die which comprises at each end of the die body, an inner deckle separated into upper and lower inner deckle portions, an inner deckle rod provided at its tip with a downward directed tongue, a side plate supporting the inner deckle and the inner deckle rod, the side plate being divided into upper and lower portions just above the inner deckle rod, a resin drain hole extending from the surface of the side plate portion between the upper and lower inner deckle portions in the slot-like passage to the outside of the die, and a side plate-mounted piece for holding the lower inner deckle portion and the tongue-provided inner deckle rod, the piece being separated into upper and lower piece portions, whereby film width adjustment and removal of oxidized resin adhered inside are conveniently performed so as to improve the operativeness of the die and the producibility of films and at the same time prevent the formation of "edge beads" on the resulting film irrespective of the kind of a resin used.

There are two methods for forming resin films such as polyethylene or polypropylene films, one being an inflation method and the other a T-shaped die method. Of these two, the T-shaped die method has been widely used for manufacturing a material for resin bags for fertilizers, moisture-proof bags or the like by laminating an extruded hot synthetic resin film with a metal foil, Cellophane paper, kraft paper or the like and then pressing the whole together.

There have been proposed various methods for the efficient manufacture of films using an improved T-shaped die. Such methods are illustrated in Japanese Utility Model Laid-Open Gazette No. 54-152274, Japanese Utility Model Publication Gazette No. 57-24488 and Japanese Utility Model Laid-Open Gazette No. 57-128423 and all of the utility models disclosed in these Gazettes were also invented by the inventor of the invention disclosed in the present patent application. The films obtained by the prior methods so proposed are approximately satisfactory which are generally excellent in transparency, uniform in thickness and free of "edge beads" (unduly thick portions of a film produced at both edges when non-improved methods are used).

However, the resins used herein include high, medium or low density polyethylene, polypropylene (PP) and ethylene-vinyl acetate (EVA), and the properties of the resin will vary depending on the method for producing the resin such as an autoclave method or a tubular method. Some resins will show the drawback that edge beads are generated at both edges of a film when they are formed into the film. For example, a resin film formed of a resin produced by the autoclave method shows relatively less edge beads, whereas a resin film formed of a resin produced by the tubular method is apt to have edge beads. Polyethylene will not readily produce edge beads at both edges of a film when formed into the film, but polypropylene and ethylene-vinyl acetate raise the problem that they will easily produce these edge beads when formed into a film. In addition, the width of films used is not always constant and it must be varied properly depending on the use of the film. Further, the resin to be used in the formation of a film using a T-shaped die is not always the same resin and, therefore, when another kind of the resin is to be used, it is necessary to remove the oxidized resin which has adhered to the lower part of the slot-like passage and the slot-like orifice between the lips. A considerable time is required for adjusting the film width and removing the oxidized resin so adhered, resulting in a substantially lowering of the productivity of films and the operativeness of a T-shaped die used.

SUMMARY OF THE INVENTION

This invention has been completed in order to overcome the drawbacks described above, and it is an object of the present invention to provide a T-shaped die which allows adjustment of the width of a film to be formed and removal of adhered oxidized resin conveniently and efficiently and also enables prevention of the formation of edge beads at both the edges of the film.

The above-mentioned object of the present invention is accomplished by a method using an improved T-shaped die wherein at each end of the die, the inner deckle is divided into an upper portion and a lower portion, and the inner deckle rod is provided at its tip with a downward-directed tongue.

The present invention consists of a T-shaped extrusion die for extruding films of thermally flowable synthetic resin, comprising a manifold, a slot passage, lips, inner deckles for varying the width of the resulting extruded film, movable perpendicularly to the resin flow and within the slot passage at the end portion of the die body, respectively, and inner deckle rods for regulating the width of the resulting extruded film, movable below the inner deckles in conjunction therewith, parallel to the moving directions of the inner deckles and within the slot passage at the end portions of the die body, respectively, said extrusion die characterized in that the inner deckles are each divided into an upper inner deckle portion and a lower inner deckle portion for conveniently varying the width of the resulting extruded film and the inner deckle rods are each provided at its tip with a tongue for regulating the width of the resulting extruded film without forming edge beads at both the edges thereof.

BRIEF DESCRIPTION OF THE DRAWINGS

The present invention will be better understood by reference to the accompanying drawings wherein:

FIG. 3 is a sectional view, partly exploded, taken along the line I—I of FIG. 2.

DETAILED DESCRIPTION OF THE PREFERRED EMBODIMENT

Figure 1:
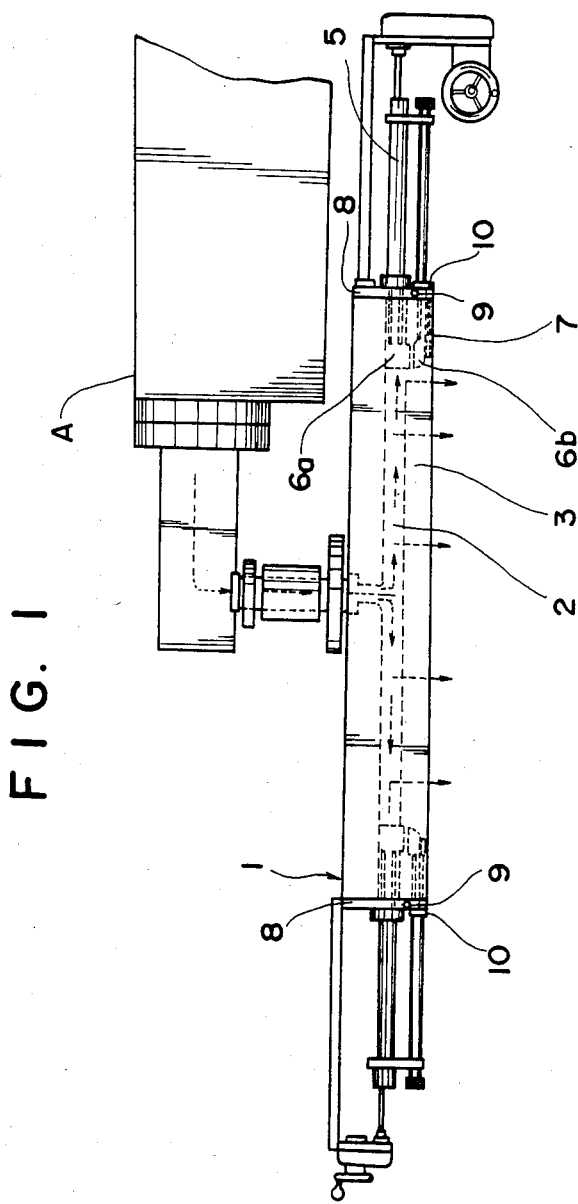
FIG. 1 is an illustrative view showing a preferred embodiment of a T-shaped die of the present invention.

First of all, the functions of the main components of a T-shaped extrusion die of the present invention will be explained hereinbelow by reference to FIGS. 1-3:

(1) Lips 4, 4

Two lips 4, 4 provide therebetween a slot discharge orifice through which a molten resin under a high pressure is extruded to be formed to a film. The magnitude of the slot orifice between the ends of the lips may be varied or adjusted as desired by the use of lip adjustable bolts (not shown) provided on the outer sides of the die body, whereby the thickness of the resulting film may be adjusted.

(2) Manifold 2

A manifold 2 is centrally positioned in the die body, extends longitudinally thereof (FIGS. 1-3) and is circular, elliptical or like in cross-section. The molten resin from an extruder is spread throughout the manifold and then passed towards the slot passage.

(3) slot passage 3

A slot passage 3 through which the molten resin is provided between the manifold and the slot orifice 4a (FIG. 3).

(4) Inner deckle 6 (Upper and lower inner deckle portions 6a and 6b being collectively termed "inner deckle deckle 6".)

An inner deckle 6 is provided at each end of the die body so that it extends from the manifold to near above the orifice 4a (FIG. 3). The inner deckles are used to vary the edge thickness of the resulting extruded film although they have some cooperative effect on regulation of the width by the inner deckle rods.

(5) Inner deckle rod 7

At each end of the die body, an inner deckle rod 7 is positioned between just above the slot-like orifice 3 and the lower end of the inner deckle but is somewhat away from the lower end. The inner deckle rod is movable in conjunction with the inner deckle to regulate the width of the flowing molten resin thereby regulating the width of the resulting extruded film (FIGS. 1-3).

(6) Support rod 5 connected to inner deckle

Figure 2:
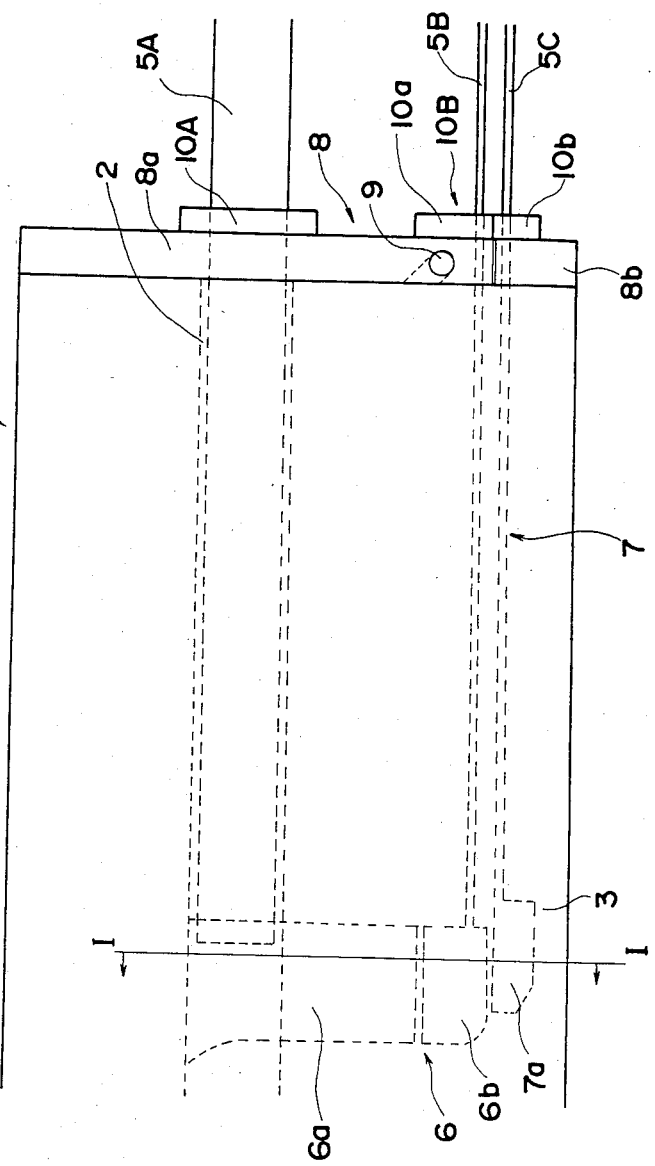
FIG. 2 is an enlarged side elevational view showing one of the end portions of the die including the side plate of FIG. 1.

At each end of the die body, a support rod 5, which is greater in diameter and strength than conventional ones to prevent it from bending due to the molten resin pressure, extends through the manifold and connected securely to the inner deckle to support it in position (FIGS. 1-3).

Referring now to FIGS. 1 to 3, the main body of a T-shaped die of the present invention comprises a manifold 2, a slot passage 3 and lips 4. At each end of the die body a rod 5 supporting and connected to the inner deckle 6a has the same shape in section as that of the manifold 2 and is movably and snugly fitted in the inside of the manifold 2 as is also indicated in Japanese Utility Model Laid-Open No. 57-128423. In the present invention, it is preferable that the inner deckle 6 (6a+6b) supported by and connected to the rod 5 (5A+5B) extend from the upper end of the manifold 2 to the lower end of the slot passage 3 and the deckle 6b be just above and preferably about 0.1 to 0.3 mm away from the inner deckle rod 7 positioned in the lowermost end of the slot passage 3. The lower surface of the inner deckle portions 6a and 6b may each be flat which is parallel with the rod 5, and it is preferable that the lower surface of the lower deckle portion 6b be recessed to take a semi-circular form in cross section and be arranged face to face with, and at a predetermined distance (preferably about 0.1-0.3 mm) away from, the upper surface of the inner deckle rod 7 having a circular shape in cross section.

In the T-shaped die 1 of the present invention, the inner deckle 6 is divided into the upper inner deckle portion 6a and the lower inner deckle portion 6b. Separation of the inner deckle 6 into upper and lower deckle portions enables the inner deckle 6a and the inner deckle 6b to be respectively adjusted whereby the width of the resulting resin film can be smoothly controlled and resin films having no edge beads can be obtained. Further, it is preferable that the lower tip of the inner deckle portion 6b be R-shaped (radiused) so that the lower part of the deckle portion 6b may closely be faced to the inner deckle rod 7. Numeral 7a in FIG. 2 designates the tongue shaped downwardly directed protrusion. As shown in the figures, the upper inner deckle portion and the lower inner deckle portion are provided with a tongue shaped protrusion.

In the T-shaped die 1 of the present invention, the inner deckle 6 is divided into the upper and lower inner deckle portions 6a and 6b and at the same time the inner deckle rod is provided at its tip with a downward-directed tongue 7a whereby edge beads-free films can be obtained from any kinds of resins. For example, not only resins made by an autoclave method but also those made by a tubular method will produce edge beads-free films when they are formed into the films using the T-shaped die of the present invention. Further, not only polyethylene but also polypropylene and ethylene-vinyl acetate resins will also produce edge beads-free films when they are formed into the films using the same die as above.

In FIG. 1, the arrows indicate the flow of a molten resin, the molten resin extruded out of an extruder machine A flows into the slot passage 3 through the manifold 2, and the width of the flowing molten resin is roughly determined by positioning of the inner deckle 6 and finally precisely determined by positioning of the tongue-provided inner deckle rod 7. The resulting film is extruded through a slot discharge orifice 4a between the lips 4.

In the present invention, it is possible to use a heat retaining cover (not shown) or cooling means (not shown) which encloses the upper part of the T-shaped die 1 in order to heat or cool the inside of the die 1, when the resin used is exchanged for another kind of a resin.

It is preferred that the inner deckle portion 6a and the inner deckle portion 6b be held respectively by pieces 10A and 10B fixed to the side plate 8 by bolts, whereby the deckle portions are made individually easily adjustable. Thus, it takes 5-6 minutes to exchange an inner deckle for another one in the T-shaped dies of the present invention, whereas it takes about 30 minutes to effect the same exchange in conventional T-shaped dies.

The T-shaped die 1 of the present invention is so constructed that, at each end of the die, the side plate 8 for supporting the inner deckle 6 and the inner deckle rod 7 may be separated into an upper and lower side plate portions 8a and 8b just above the inner deckle rod 7 so as to facilitate rapid and easy removal of oxidized resin adhered to the lower part of each of the slot-like passage 3 and the lips 4. In this way, separation of the upper and lower portions of the side plates 8 will enable the inner deckle rod 7 to be pulled out of the die body only by removal of the lower part 8b of the side plate, so that the resin remover (not shown) disclosed in Japanese Utility Model Publication No. 55-53388 in which the present inventor is also described as the inventor, may conveniently be used for rapid and easy removal of the adhered oxidized resin. The upper and lower side plates portions 8a and 8b are collectively termed "side plate 8". In this case, if a piece 10B for holding the inner deckle portion 6b and the inner deckle rod 7 is divided into upper and lower piece portions 10a and 10b, then the removal of the adhered oxidized resin can be further promoted.

Further, since the inner deckle 6 is divided into the upper and lower inner deckle portions 6a and 6b in the present invention, part of the molten resin is apt to flow into and stagnate in the space defined by the deckle portions 6a, 6b and the side plate 8 in the slot-like passage 3 thereby to cause clogging. It is therefore preferable that a resin drain hole 9 be provided at the side plate 8 in order to remove the stagnant material from the space. This resin drain hole 9 has normally a plug fitted therein, and the plug is removed when the resin is to be drained and is again fitted in the hole after the removal of the stagnant resin.

In accordance with the present invention described above, edge beads-free resin films can be produced and easy adjustment of film width as well as easy removal of the oxidized resin adhered to the component elements is conveniently performed irrespective of the kind of resin used or the type of method by which the resin used. Therefore, use of the T-shaped die of the present invention will remarkably improve the efficiency of operation and the productivity of films and will at the same time, enable edge beads-free films to be produced, facilitate the film products to be wound and decrease the resin waste because of the absence of edge beads which are otherwise necessary to remove by cutting.

What is claimed is:

1. In a T-shaped extrusion die for extruding a film of thermally flowable synthetic resin, comprising a die body having a manifold for passing the resin to a discharge orifice, said manifold centrally positioned in said die body and extending longitudinally therein and perpendicular to the resin flow, a pair of lips at the end of said manifold forming said discharge orifice, inner deckles for varying the longitudinal width of the extruded film, a slot passage between said manifold and said discharge orifice, said inner deckles being movable perpendicularly to the direction of the resin flow in said slot passage, inner deckle rods for regulating the width of the extruded film located below the inner deckles and movable in conjunction with and parallel to the moving directions of the inner deckles, said inner deckle rods being located within the slot passage, the improvement wherein said inner deckles are each divided into an upper inner deckle portion and lower inner deckle portion for varying the width of said extruded film, said upper inner deckle portion and said lower inner deckle portion being shaped to snugly fit in said manifold and said slot passage, and the inner deckle rods are each provided at the tip thereof with a tongue shaped protrusion for preventing the formation of edge beads at both edges of the extruded film, side plates supporting said upper and lower inner deckles portions, and said side plates being divided into an upper and a lower side plate portions just above said inner deckle rods.

2. A T-shaped extrusion die according to claim 1, wherein pieces fixed on the side plate and supporting the lower inner deckle portion and the inner deckle rod are each divided above the inner deckle rod into upper and lower piece portions.

* * * * *